J. W. KELLY.
PISTON PACKING DISK.
APPLICATION FILED JULY 30, 1920.

1,399,060.

Patented Dec. 6, 1921.

Witnesses
Rudolph T. Berg.
Fred E. Presler.

Inventor
JAMES W. KELLY.
By Charles W. Hill Atty.

UNITED STATES PATENT OFFICE.

JAMES W. KELLY, OF CHICAGO, ILLINOIS.

PISTON-PACKING DISKS.

1,399,060.  Specification of Letters Patent.  Patented Dec. 6, 1921.

Application filed July 30, 1920. Serial No. 400,040.

*To all whom it may concern:*

Be it known that I, JAMES W. KELLY, a citizen of the United States, residing at Chicago, in the county of Cook and State of Illinois, have invented a new and useful Improvement in Piston-Packing Disks; and I do hereby declare that the following is a full, clear, and exact description of the same, reference being had to the accompanying drawings, and to the numerals of reference marked thereon, which form a part of this specification.

My invention relates particularly to a packing disk or device designed for use with a reciprocating piston whereby the expansive medium used to reciprocate the piston may be utilized to effect an expansive action upon the packing disk to cause the same to always have a tight fit with the cylinder. In the past, pistons have generally been constructed with grooves in which packing rings were inserted, but in practice, it has been found that these rings soon wore out and became inefficient and had to be replaced since they could not be made of sufficiently durable resiliency to withstand the hard action to which they were subjected.

It is therefore an object of my invention to devise a packing device which does not depend solely upon its own inherent resiliency, but which may be so constructed and so placed upon a piston that the expansive medium becomes effective to always produce a tight fit.

It is a further object of my invention to devise a disk that has a resilient packing border which may be acted upon by the expansive medium.

It is a further object of my invention to provide the head of a piston with a packing which is directly subjected to the pressure of the expansive medium.

Further objects and advantages not herein specifically enumerated will be apparent from the following description and disclosures in the drawings.

My invention (in a preferred form) is hereinafter more specifically described and claimed.

Figure 1:
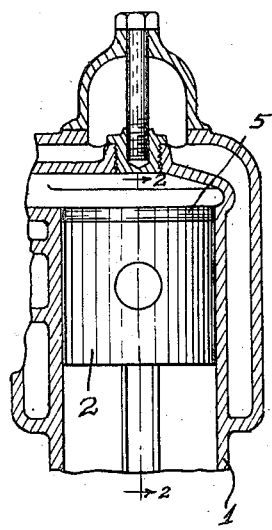
Figure 1 is a section of a cylinder showing a piston and my improved packing in perspective.
Figure 2:
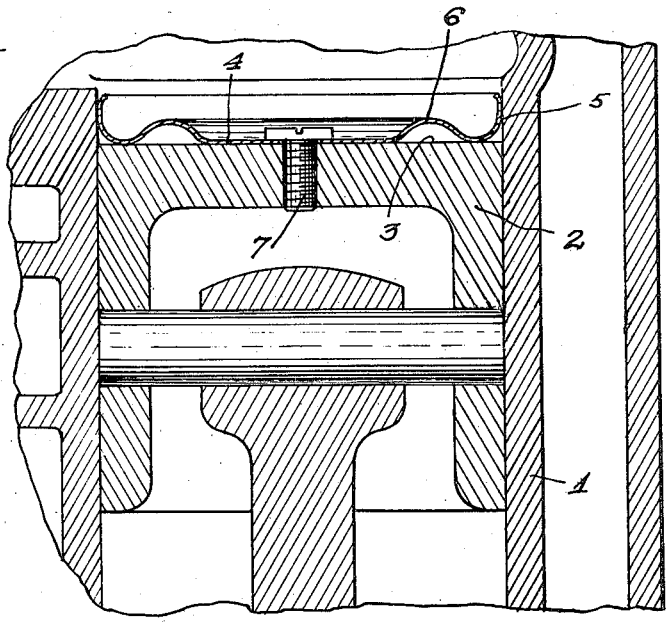
Fig. 2 is a section on the line 2—2 of Fig. 1, on an enlarged scale.
Figure 3:
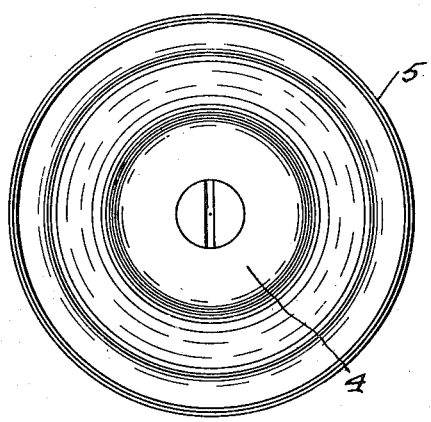
Fig. 3 is a top plan view of my improved packing disk.

In referring to the drawings in which similar reference numerals refer to similar features in the different views, it will be noted that I have illustrated a cylinder having an internal chamber designed to receive a piston with my improved packing device or disk secured to the head thereof. Any expansive fluid or medium may be used to reciprocate the piston and exert an expansive force against the packing disk which it is contemplated may be varied as occasion may require. Accordingly, for the purpose of illustrating my invention, I have shown a cylinder 1, in which a piston 2 operates. On the top face 3 of the piston, which I will term the head, I secure my improved resilient packing disk or device 4, which may be constructed of any suitable material, which provides a good resilient packing border. Brass or resilient copper alloy may be used. In the present embodiment of my invention, I have provided the packing disk 4 with a curved resilient annular upstanding flange 5 against which the expansive force of the power medium may act to press the same tightly against the wall of the cylinder. To strengthen the disk and give it the proper rigidity, the same may be corrugated as shown at 6 in Fig. 2. The disk 4 may be secured to the piston in any suitable way; in the drawing I have shown a set screw 7 having a head of sufficient size to cover a proper clamping area to prevent rupture of the disk.

Figure 4:
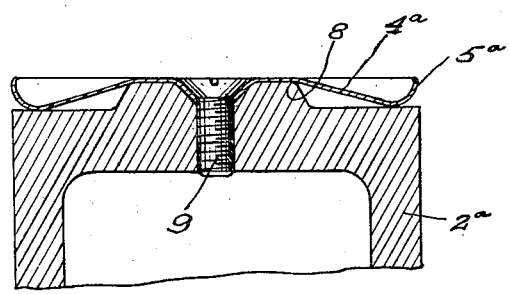
Fig. 4 is a slight modification of my disk and the manner of supporting the same.

In the modified form shown in Fig. 4, the piston 2ª is provided with a raised portion or boss 8 having a countersunk hole therein, and the resilient packing disk 4ª is secured upon this boss by means of a set screw 9 having a beveled head which draws the surrounding portions of the disk into the countersunk hole. From the outer circumference of the boss 8, the disk 4ª descends upon a bevel to a point adjacent the outer circumference of the piston, where it rests upon the piston head and is provided with a slightly curved upstanding resilient annular flange 5ª which is designed to receive the expansive force for pressing said flange tightly against the walls of the cylinder.

The disks 4 and 4ᵃ are so designed that their resilient annular upstanding flanges or packing borders fit the chambers in the cylinder and receive pressure from the expansive medium that may be used to impart power to the piston, and these flanges are so constructed through their lower curved parts that a certain leverage is attained to allow outward expansion.
It will accordingly be observed that I have devised a packing device which is always effective, which does not necessarily depend upon its own inherent resiliency or compensating powers to provide an air tight fit, which is susceptible of use with any piston, and does not require a specially constructed one, and which is simple, easily attachable and durable for the purpose set forth.
I am aware that many changes may be made, and numerous details of construction varied through a wide range without departing from the principles of this invention, and I therefore do not purpose limiting the patent granted hereon otherwise than necessitated by the prior art.

I claim as my invention:

1. The combination with a piston having a boss formed thereon, of a packing member on said piston comprising a flat ring portion seated on said boss, a downwardly inclined portion integral therewith and resting against the head of said piston, and a circumferential flange integral with said inclined portion.

2. The combination with a piston, of a countersunk boss integrally formed centrally on the head end of said piston, an apertured packing member on said piston comprising a flat portion seated on said boss, the inner margin of said flat portion deflected to seat in the countersunk portion of said boss, an inclined disk portion integral with the outer margin of said flat portion, a flange integral with said inclined disk portion disposed at right angles to said flat portion, and a screw projection through the deflected margin of said flat portion and threaded into said piston to hold the packing member secured in position.

In testimony whereof I have hereunto subscribed my name in the presence of two subscribing witnesses:

JAMES W. KELLY.

Witnesses:
FRED E. PAESLER,
LAWRENCE PEIRSTEW.